United States Patent [19]

Kinuhata et al.

[11] 4,057,835

[45] Nov. 8, 1977

[54] SYSTEM FOR CONVERTING NUMBER OF LINES OF TELEVISION SIGNAL

[75] Inventors: Koji Kinuhata, Tokyo; Kitsutaro Amano, Yokohama; Hiroshi Sasaki, Kashiwa; Hideo Yamamoto, Sagamihara, all of Japan

[73] Assignee: Kokusai Denshin Denwa Kabushiki Kaisha, Japan

[21] Appl. No.: 701,035

[22] Filed: June 29, 1976

[30] Foreign Application Priority Data

Sept. 27, 1975 Japan .............................. 50-116847

[51] Int. Cl.$^2$ ............................................. H04N 5/02
[52] U.S. Cl. .................................................. 358/140
[58] Field of Search ................. 358/140, 11, 137, 288

[56] References Cited

U.S. PATENT DOCUMENTS

| 3,073,896 | 1/1963 | James ................................. 358/140 |
| 3,400,211 | 9/1968 | Rainger et al. ...................... 358/140 |
| 3,457,369 | 7/1969 | Davies et al. ....................... 358/140 |

*Primary Examiner*—Richard Murray
*Attorney, Agent, or Firm*—Robert E. Burns; Emmanuel J. Lobato; Bruce L. Adams

[57] ABSTRACT

A system for converting the number of lines of a television signal having interlaced frames each formed by signals of two adjacent fields, in which signal of each field of each frame are formed by sequentially weighting and combining line signals of the former and the latter of the two fields under the conditions, that the order of lines is not reversed in the output frame, that the lines are not repeated in the same field, and that stational picture areas and moving picture areas of each frame are separately and suitably handled.

3 Claims, 20 Drawing Figures

(625)　　　(525)

(525)　　　(625)

SYSTEM FOR CONVERTING NUMBER OF LINES OF TELEVISION SIGNAL

This invention relates to a system for converting the number of lines in one field of a television signal having frames each formed by two adjacent fields.

An object of this invention is to provide a system for converting the number of lines of one field of a television signal having frames each formed by two adjacent fields, in which one field of an output television signal of high precision is formed by two interlaced successive fields, that is, one frame of an input television signal in such a manner that stational picture areas and moving picture areas of each frame are separately and suitably handled.

The principle, construction and operation of this invention will be clearly understood from the following detailed description taken in conjunction with the accompanying drawings, in which.

For ready understanding of the principle of the invention, a description will be given first of a conventional method for conversion of the number of lines from a television system adopted in Europe, i.e. a 625/50 system, to that in the United States and in Japan, i.e. a 525/60 system.

Figure 1A:
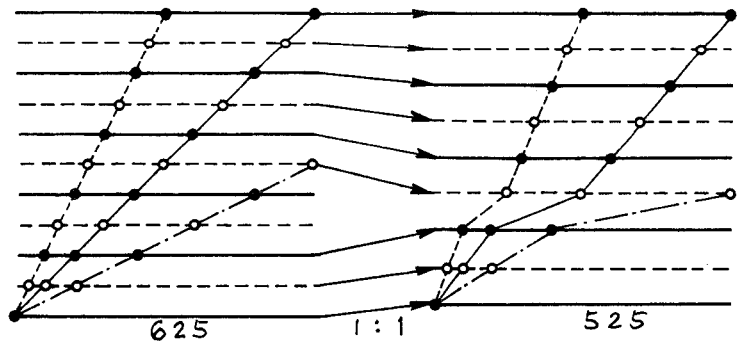
FIGS. 1A, 1B, 2A and 2B are line arrangement diagrams explanatory of conventional line conversion.
Figure 1B:
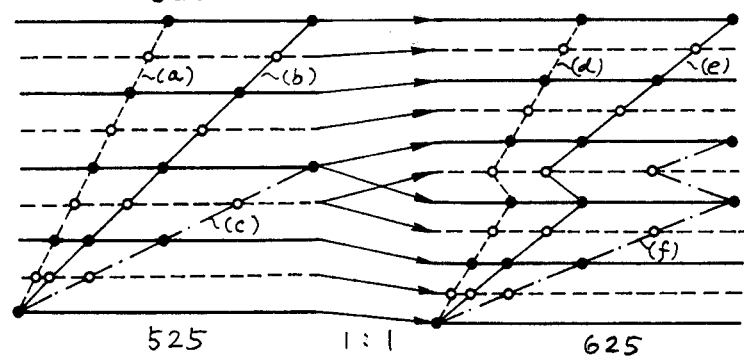

In case of decreasing the number of lines for conversion of the number of lines in the prior art, as shown in FIG. 1A, only a required number of those lines (for example, five lines indicated by solid lines) for forming one field of an output television signal, which are the closest to the lines of the output television signal, are extracted from lines (for example, six lines indicated by solid lines) of one field of an input television signal, thereby to achieve conversion of the number of lines. Further, also in case of increasing the number of lines as shown in FIG. 1B, those of the lines (for example, five lines indicated by solid lines) of one field of the input television signal, which are the closest to the lines of the output television signal, are repeatedly used as occasion demands, thus obtaining a required number of lines (for example, six lines indicated by solid lines) for forming one field of the output television signal. By repeating these operations, fifty lines are decreased or increased in one frame.

Figure 2A:
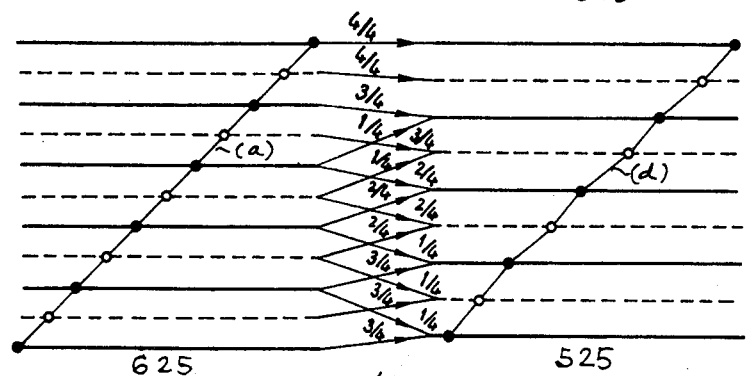
Figure 2B:
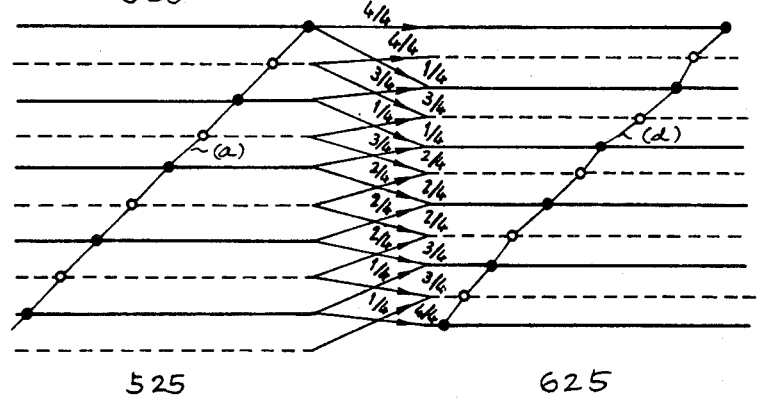
Figure 3A:
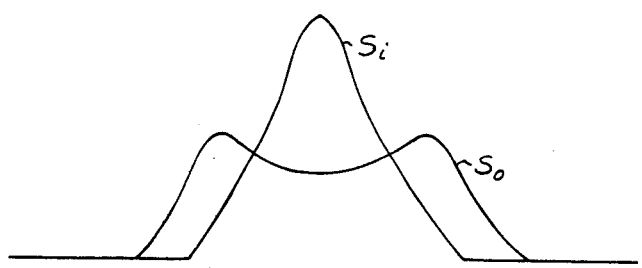
FIGS. 3A and 3B are waveform diagrams showing waveform distortion caused by the conventional line conversion.
Figure 3B:
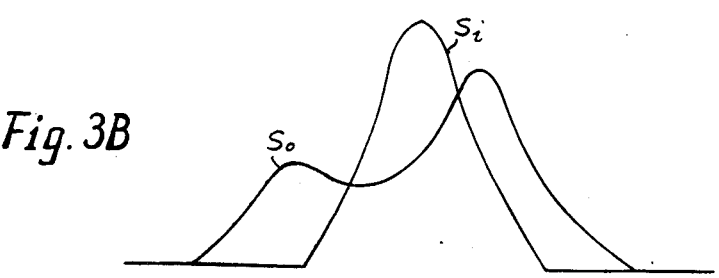

As a result of this, the straight lines (a), (b) and (c) before conversion become such as identified by (d), (e) and (f) to produce geometrical distortion of pictures as shown in FIG. 1B. To avoid this, there is employed a method such as is shown in FIGS. 2A and 2B in which two adjacent lines in the same field are weighted respectively and combined (numerical values indicating weight factors) to visually alleviate distortion. However, in a case where a picture signal, especially a pisture signal $S_o$ such as a white signal inclined by 45° to the scanning lines exists as shown in FIG. 3A (weight combining ratio 2/4 : 2/4) or in FIG. 3B (weight combining ratio 1/4 : 3/4), such a method is defective in that the signal waveform $S_o$ after conversion becomes remarkedly dull owing to a level change by the signal to produce greatly deteriorated resolution.

Figure 4A:
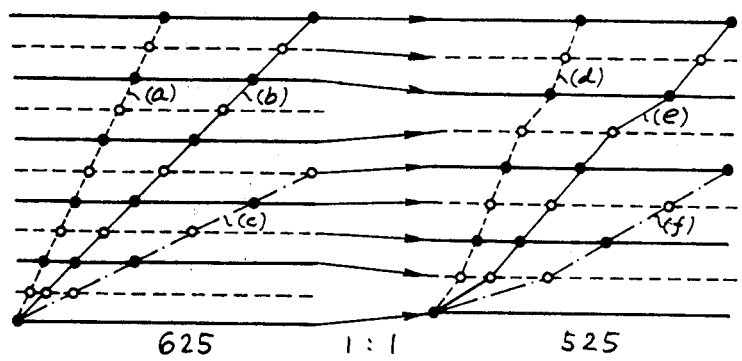
FIGS. 4A, 4B, 5A, 5B, 7A and 7B are line arrangement diagrams explanatory of line conversion according to this invention.
Figure 4B:
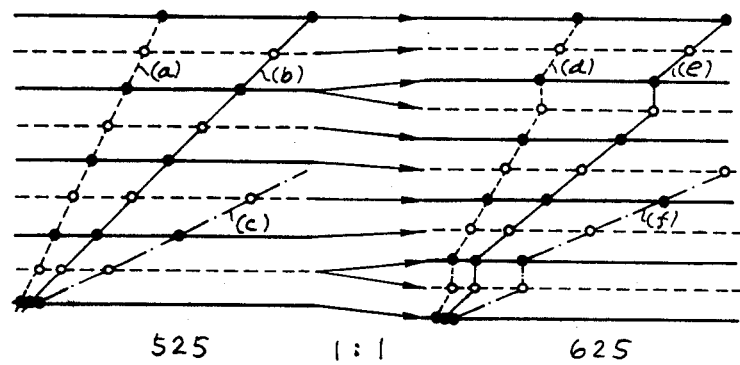

With the other method for decreasing geometrical distortion of pictures proposed in our co-pending U.S. patent application Ser. No. 472,505, now U.S. Pat. No. 3,970,776, in case of decreasing the number of lines, as shown in FIG. 4A, those lines (for example, eleven lines indicated by solid and broken lines) of two interlaced successive fields, that is, one frame, of an input television signal which are the closest to the lines (for example, five lines indicated by solid lines) of an output television signal, are extracted and sequentially selected under the conditions that the order of the lines in the output frame is not reversed and that no repetition is effected in the same field, thus forming each output field. This apparently enables remarked alleviation of the distortion, as compared with the converted picture shown in FIGS. 1A and 1B. Since the method for increasing the number of lines is apparent from FIG. 4B, no detailed description will be given.

Figure 5A:
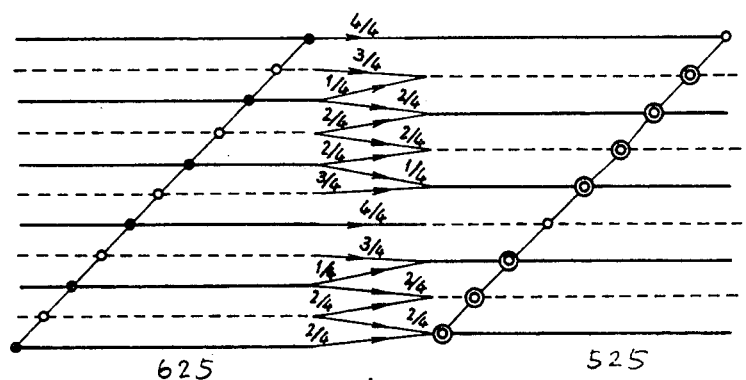
Figure 5B:
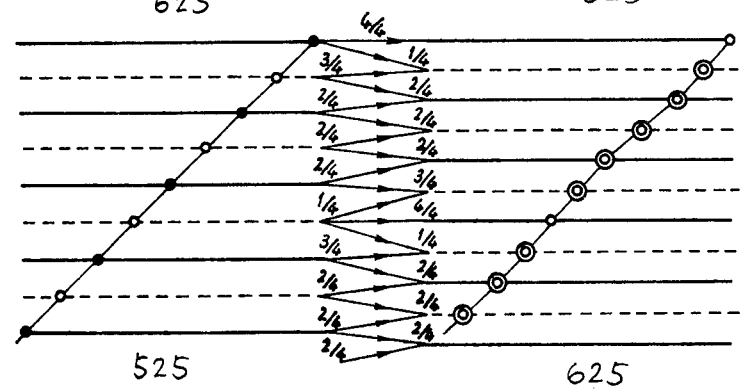
Figure 6A:
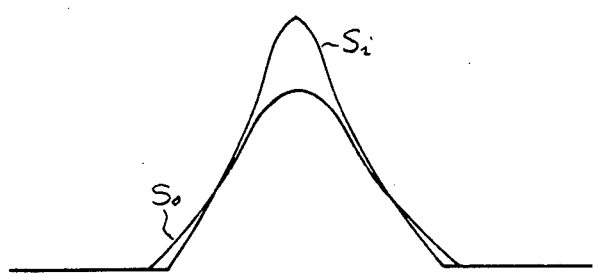
FIGS. 6A and 6B are waveform diagrams showing waveform distortion caused by the line conversion of this invention.
Figure 6B:
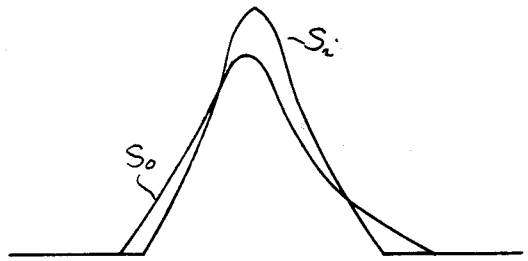

In case of further reducing the distortion of the picture even if resolution is a little lowered, it is possible to adopt such a method as is shown in FIGS. 5A and 5B, in which two adjacent lines in the same frame are weighted respectively and combined as occasion demands. FIG. 5A shows the case of converting the number of lines from 625 to 525 and FIG. 5B the case of converting the number of lines from 525 to 625. Also in this case, dullness of the waveform due to the above weight combining is far smaller than that in FIGS. 3A and 3B as shown in FIGS. 6A and 6B under the same conditions. This naturally deteriorates resolution as compared with that in the case of no weight combining of lines, but the amount of deterioration is negligibly small as compared with that in the prior art.

It is apparent that the above results are caused by an essential difference between signal processing in one field and that in one frame. Namely, as described previously, each complete picture of the television signal is formed by one frame, that is, two successive fields, so that the formation of an output signal from one frame of an input signal hereinafter refered to an in-frame line interpolation method is nothing but effective use of the amount of information twice as large as that in the case of forming the output signal from one field of the input signal. Consequently, deterioration of the quality of the converted picture can easily be suppressed to substantially ½.

In this way, the in-frame line interpolation method gives a very good result for a stational input picture signal, but the following problems occur for a moving input picture signal. Namely, since two fields forming one frame are separated in time to each other, jagged distortion is caused at the edge parts of the moving pictures by the system for converting the number of lines as shown in FIGS. 4A, 4B, 5A and 5B. This distortion is caused because the rate of contribution of the two input fields separated in time against an output field periodically fluctuates in the vertical direction of the output field in accordance with the rate of combining adjacent scanning lines to be combined. Further, this distortion becomes larger in proportion of the amount of movement in the moving pictures.

Figure 7A:
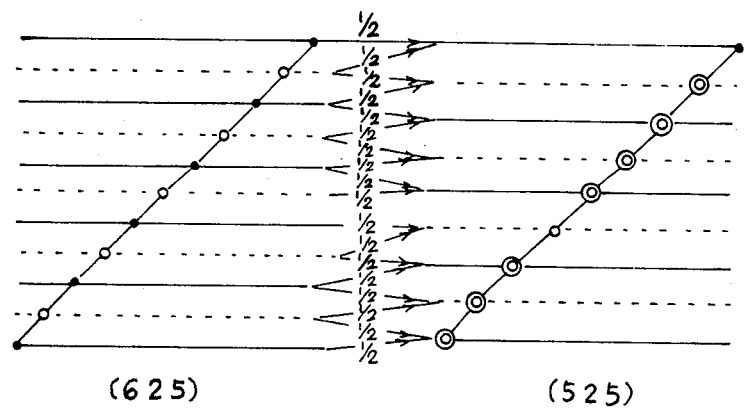
Figure 7B:
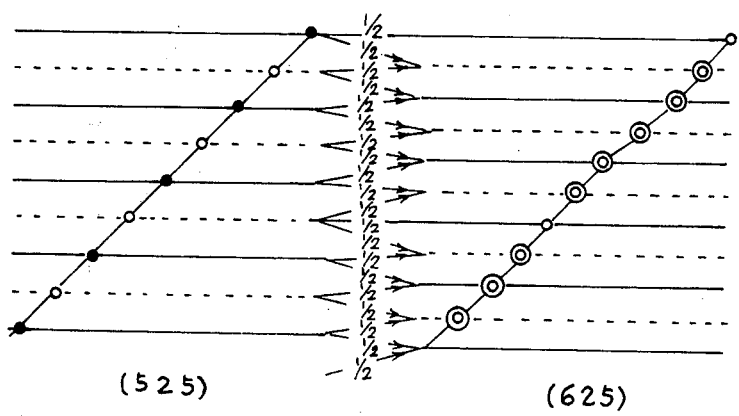

Accordingly, if the output lines are formed under a condition where the weight combining ratio is fixed for all the picture area as shown in FIG. 7A and 7B, this distortion on the moving pictures can be eliminated, while the above mentioned geometrical distortion becomes conspicuous for stational pictures. In the moving pictures, however, the geometrical distortion is hardly conspicuous for the moving pictures since they have only a little high frequency component. As mentioned above, the line number conversion system shown in FIG. 5 (hereinafter referred to $LI_1$ system) is suitable for the stational pictures, while the line number conversion system shown in FIG. 7 (hereinafter refered to $LI_2$ system) is suitable for moving pictures.

In accordance with the principle of this invention, the umber of lines of an input television signal is converted under a condition where the stational picture areas and the moving picture areas are controlled by the $LI_1$ method and $LI_2$ method to provide an output television signal of high precision.

In this invention, the stational picture areas and the moving picture areas are detected as follows. Namely, if a level diffference between two picture elements of two sampling points separated by one frame from each other exceeds a predetermined threshold level L, the later picture element is detected as a moving picture element. A moving picture area is defined as a block of successive M picture elements, in which a number of picture elements more than N are detected as the moving picture elements. In this case, the successive M picture elements are picked up along each scanning line or adjacent scanning lines or along a direction perpendicular to the scanning lines. As a result of our test, when the maximum value of the input television signal was one volt, a good result was obtained under a condition: L = $\frac{1}{5}$ volts, M = 10, and N = 3.

With reference to the drawings, an example of this invention will be described as being applied to the conversion of the number of lines of a television signal of the 625/50 system to that of a television signal of the 525/60 system.

Figure 8:
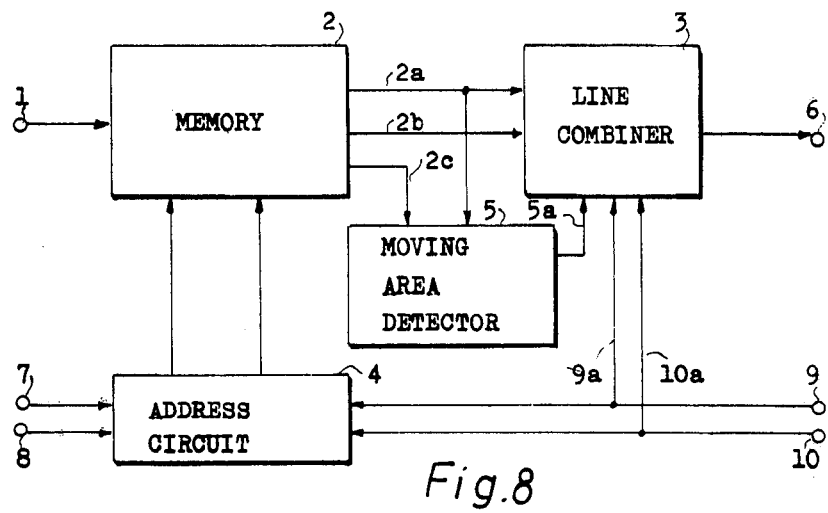
FIG. 8 is a block diagram illustating an example of this invention.
Figure 9:
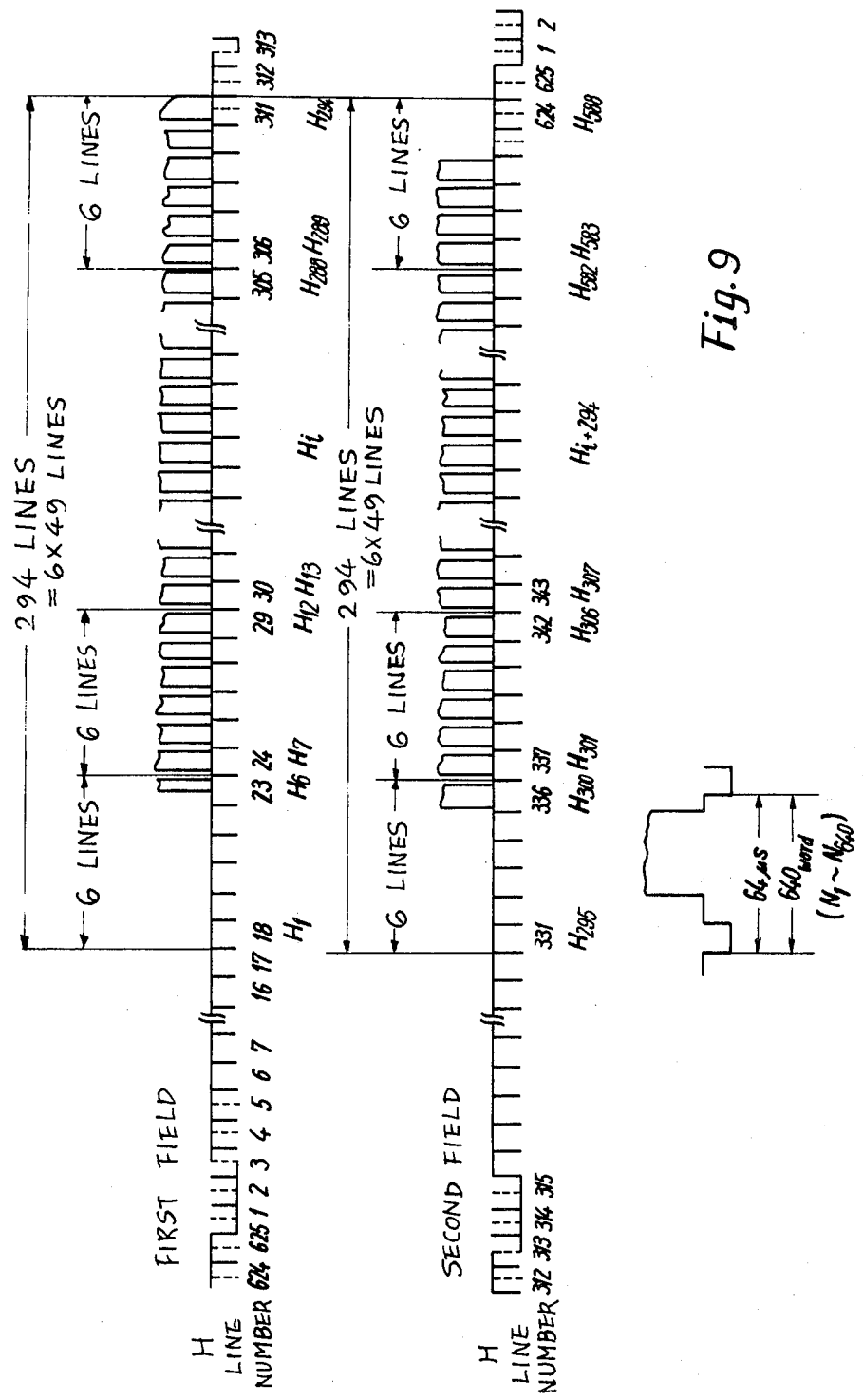
FIG. 9 is a time chart explanatory of waveforms in a 625/50 system.

FIG. 8 is a fundamental system diagram for realizing the number-of-lines conversion system of this invention. Reference numeral 1 indicates a signal input terminal; 2 designates a memory; 3 represents a line combiner; 4 denotes an address circuit (e.g. a non-locked type control device of the kind shown in U.S. Pat. No. 3,676,585) for controlling the address-designation, the write operation and the read operation of the memory 2; 5 indicates a moving area detector described below; 6 identifies a signal output terminal; 7 and 8 show input terminals for horizontal and vertical synchronizing pulses of the 625/50 system, respectively; and 9 and 10 refer to input terminals for horizontal and vertical synchronizing pulses of the 525/60 system, respectively. The input television signal of the 625/50 system includes information of 625 lines in first and second fields, that is, in one frame. Let it be assumed that this television signal is sampled, for example, at 10 MHz, converted into an 80M-bit PCM code system, applied as 8-bit parallel digital code words to the signal input terminal 1 and then stored in the memory 2. Then a signal of one field of the 525/60 system is produced from the signal of one frame of the 625/50 system stored in the memory 2. Since a field blanking period exists in 625 lines of the input signal, there is no need of storing all the 625 lines. In the present example, information of 294 lines except a part of the field blanking period is stored. Namely, as illustrated in FIG. 9, 18th to 311th lines in the first field, 331st to 624th lines in the second field and 18th to 311 lines in the first field of the suceeding frame are sequentially stored in the memory 2 until the instant of writing the next subsequent frame. Signals of 245 lines are produced from the stored 294 lines by weight-combining signals of five lines for each group of ten lines in twelve lines as will be described later, and a vertical blanking signal of the 525/60 system is added to the above signals of produced 245 lines to provide an output signal. Thus, the output signal of 262.5 lines for one field is produced. Lines of the input signal are marked with numbers (H numbers) $H_1$ to $H_{294}$, $H_{295}$ to $H_{588}$ and $H_{589}$ to $H_{882}$ for the address designation of the memory 2. Further, in this case, one line has information of 80M bit/sec. × 65 $\mu sec.$ = 5125 bits. However, these information bits are divided into groups of 8 bits (= 1 word) and marked with numbers (N numbers) $N_1$ to $N_{640}$ in the order of arrangement of the words. At this time, it is also possible to store the signal except the horizontal blanking period so as to reduce the required capacity of the memory 2.

Each of the element circuits will hereinafter be described in detail.

Figure 10:
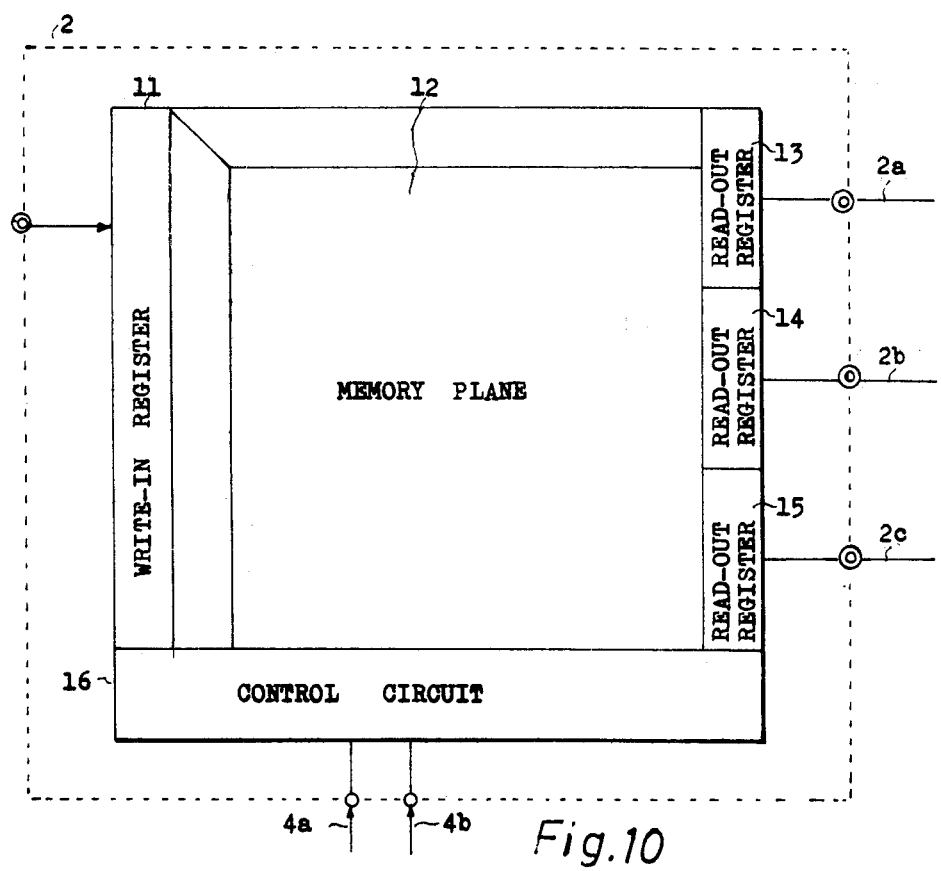
FIG. 10 is a block diagram illustrating an example of a memory employed in the example shown in FIG. 8.

The memory 2 comprises, as shown in FIG. 10, a write-in register 11, a memory matrix plane 12, read-out registers 13, 14 and 15 and a control circuit 16, and this memory 2 has a memory capacity of 882 × 640 = 564,480 words (1 word = 8 bits) for storing the information of 882 lines. The addresses of the memory 2 are indicated by a combination ($H_i$, $N_r$) using the aforementioned H numbers and N numbers, and the word information of each address is identified by a combination W ($H_i$, $N_r$), ($i$ = 1, 2, ....., 882, $r$ = 1, 2, ... 640).

The write-in register 11 sequentially stores therein the information of 882 lines from ($H_1$, $N_1$) to ($H_{882}$, $N_{640}$) every word under control of the control circuit 16 and holds the information until the next frame is written.

The control circuit 13 comprises, as well-known for a memory matrix, an address register, an address decoder, a word driver, and a timing-and-control device, etc.

For convenience of explanation, it is assumed that the newest field information, the next field information and the third (oldest) field information are respectively stored in the read-out registers 13, 14 and 15. The line combiner 3 successively combines two successive scanning lines in one frame of information read-out from the read-out registers 13, 14 and 15.

Figure 11:
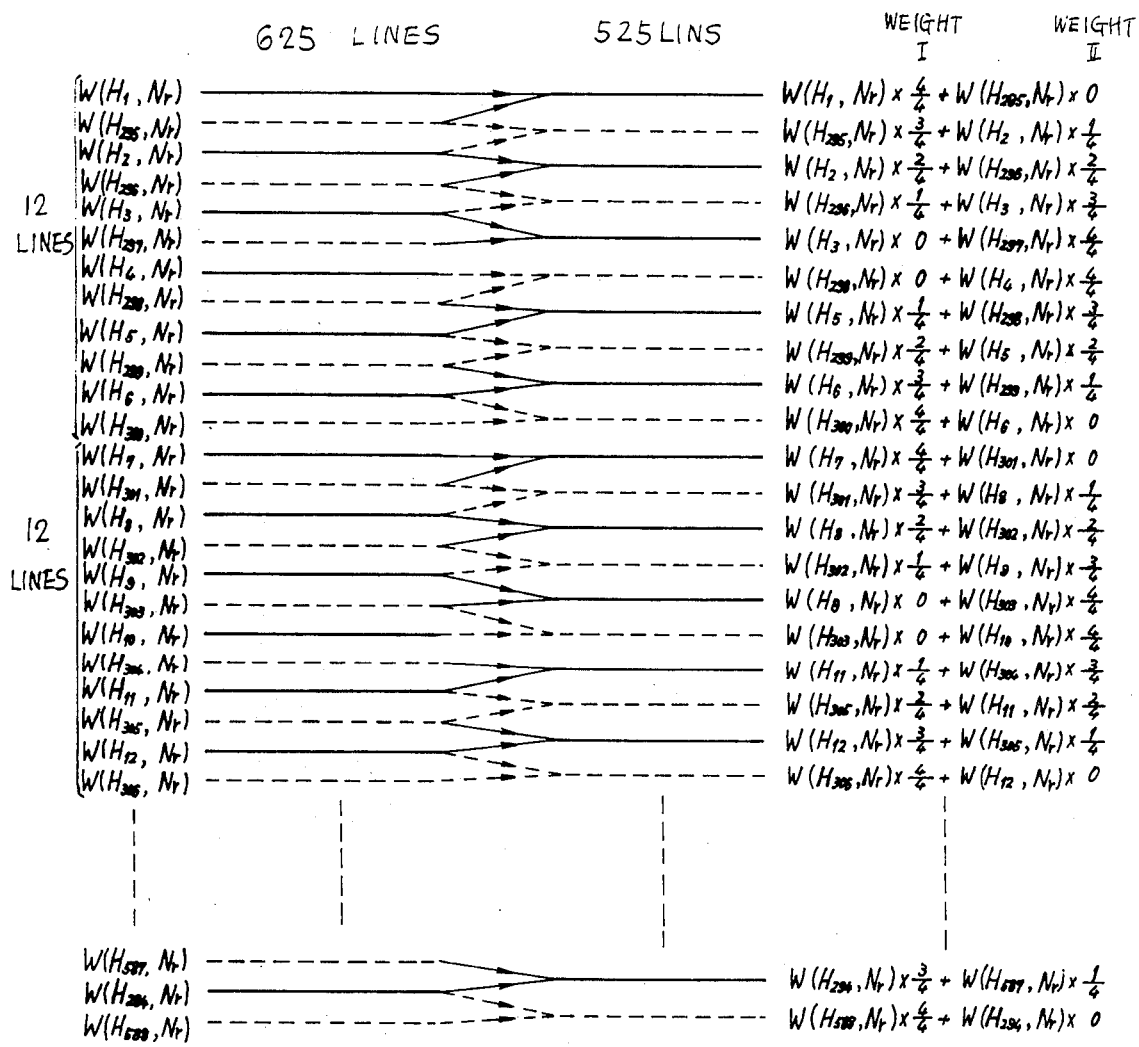
FIG. 11 is a line arrangement diagram explanatory of line combining according to this invention.

The stational picture areas are handled as shown in FIG. 11. In FIG. 11, solid-line arrows indicate the case of forming an odd-number field, and broken-line arrows indicate the case of forming an even-number field.

Figure 12:
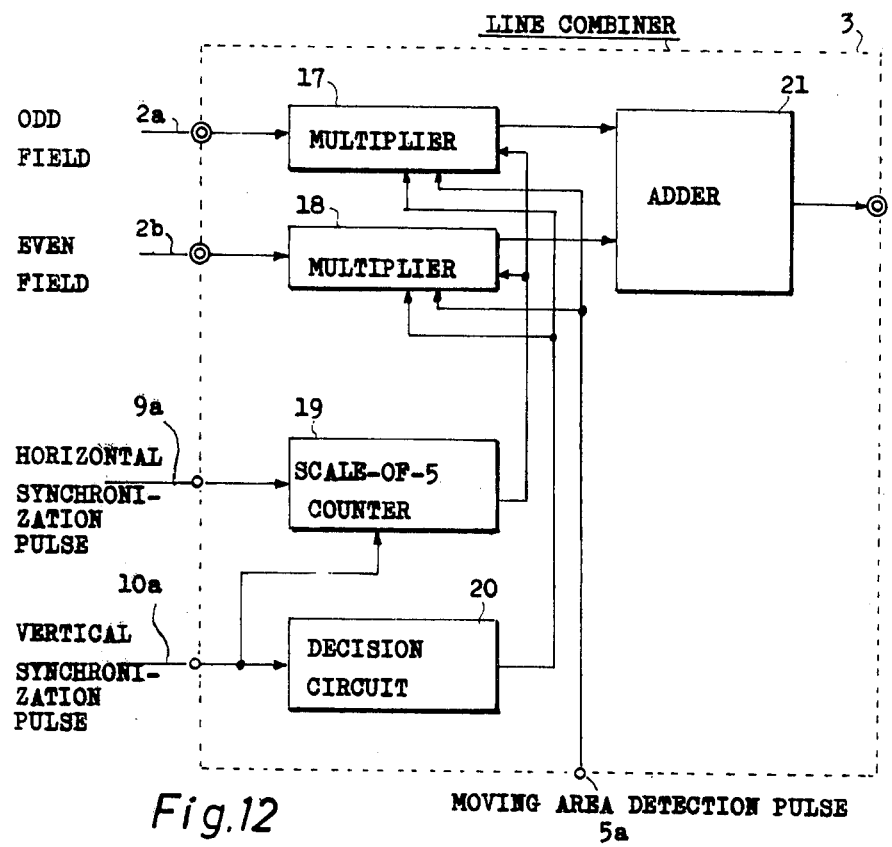
FIG. 12 is a block diagram illustrating an example of a line combiner employed in the example shown in FIG. 8.

FIG. 12 is a block diagram illustrating an example of the line combiner 3. An input line 2a receives the information of the lines of the first field (the odd-number field), and an input line 2b receives the information of the lines of the second field (the even-number field). As described above, the line combiner 3 combines the above information every 10 lines while changing weight factors in such an order, for example, as shown in Table 1. The line combiner 3 is composed of a scale-of-five counter 19 for obtaining information of 5 lines, 8-digit binary multipliers 17 and 18 whose multiples are controlled by the above counter 19, an 8-digit binary adder 21 and a field decision circuit 20 for detecting whether the odd number field or the even-number field in response to vertical synchronizing pulses to actuate the corresponding one group of different multiple groups of the multipliers 17 and 18.

The field decision circuit 20 comprises, for example, a cascade integrator circuit disclosed in "Television engineering", McGRAW-HILL BOOK COMPANY, Inc. 1952, pages 205 to 206 to detect vertical synchronizing pulses, and a binary counter for counting the detected vertical synchronizing pulses.

Table 1

| State of Counter | Multiple | | | |
| --- | --- | --- | --- | --- |
| | Odd-number field | | Even-number field | |
| | Multiplier 17 | Multiplier 18 | Multiplier 17 | Multiplier 18 |
| 0 | 4/4 | 0 | 3/4 | 1/4 |
| 1 | 2/4 | 2/4 | 1/4 | 3/4 |
| 2 | 0 | 4/4 | 0 | 4/4 |
| 3 | 1/4 | 3/4 | 2/4 | 2/4 |
| 4 | 3/4 | 1/4 | 4/4 | 0 |

On the other hand, the weight factor is fixed to ½ for the moving picture area. Accordingly, respective multiples of the multipliers 17 and 18 are controlled by the scale-of-5 counter 19, the field decision circuit 20 and a moving area detection signal 5a from the moving area detector 5.

Figure 13:
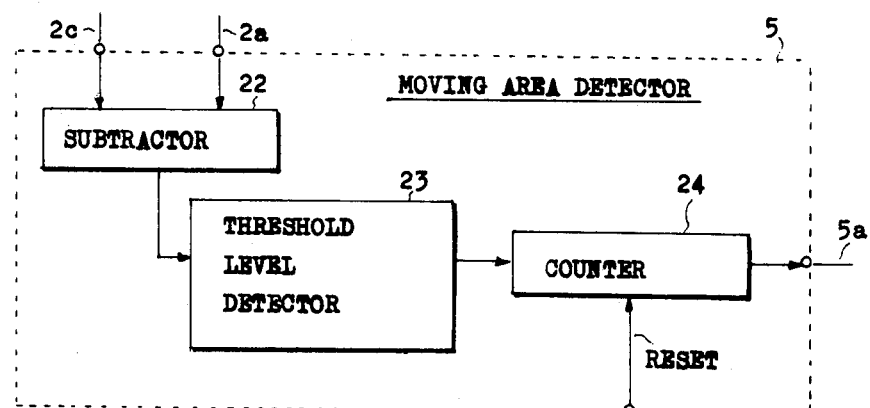
FIG. 13 is a block diagram illustrating an example of a moving area detector employed in the example shown in FIG. 8.

An example of the moving area detector 5 is shown in FIG. 13. The two outputs 2a and 2c of the memory 2 have a time difference equal to one frame of the input television signal from each other. A subtractor 22 produces a difference between the outputs 2a and 2c, and a threshold level detector 23 generates a detection pulse when the absolute value of the difference between the outputs 2a and 2c exceeds the threshold value L (e.g. ½⁵ volts). A counter 24 is a scale-of-3 counter by way of example. If the moving picture area is defined as a block of successive 10 picture elements, the scale-of-3 counter 24 is reset by the output of known detection means (not shown), which is employed for detecting completion of processing ten picture elements. The counter 24 produces the moving area detection signal 5a for each moving picture area.

Since conversion from 525 lines to 625 lines can be achieved by substantially the same element circuits and the same control system as those in the system described above, detailed descriptions are omitted.

Although the foregoing description has been given in connection with the case where the line information of the television signal to be converted is digitalized and stored in the memory, it is a matter of course that the line information can be stored and processed as analog information by the employment of charge coupled devices (CCD) or the like.

As has been described in the foregoing, the converted television signal of the present invention, is extremely improved in distortion of a picture and in deterioration of its waveform as compared with the signal obtainable with the conventional system. Therefore, the invention is applicable not only to the signal conversion of commercial television system of different number of fields but also to the system conversion of picturephones of the same number of fields.

What we claim is:

1. A system for converting the number of lines of an input television signal having frames each formed by two adjacent interlaced fields comprising:

input terminal means for receiving said input television signal;

memory means connected to said input terminal means for successively storing said input television signal;

first synchronizing terminal means for receiving horizontal synchronizing pulses and vertical synchronizing pulses of said input television signal;

second synchronizing terminal means for receiving horizontal synchronizing pulses and vertical synchronizing pulses of an output television signal to be obtained;

address circuit means connected to said memory means, said first synchronizing terminal means and said second synchronizing terminal means for performing the write-in operation to the memory means in response to said horizontal synchronizing pulses and said vertical synchronizing pulses of the first synchronizing terminal means and for performing the read-out operation from the memory means in response to said horizontal synchronizing pulses and said vertical synchronizing pulses of said second synchronizing terminal means;

detection means connected to said memory means for detecting from the contents of said memory means, moving picture areas of said frames each formed by a block of successive moving picture elements, each of which has a level difference more than a predetermined threshold level from the level of a corresponding picture element in an immediately preceding frame of said input television signal, and for generating a moving area detection signal in response to each detection of said moving picture areas;

line combiner means connecting said memory means, said detection means and said second synchronizing terminal means for forming each interlaced frame of said output television signal by signals of two adjacent fields of said input television signal read-out from said memory means in response to said moving area detection signal, said horizontal synchronizing pulses of said second synchronizing terminal means under a condition where signals of each field of said each frame of said output television signal are formed by sequentially weighting and combining line signals of the former and the latter of the two fields of said input television signal, so that the order of lines is not reversed in said output frame while the lines are not repeated in the same field, and under a condition where the weight factor of said weighting and combining is constant for said moving picture area but variable for each stational picture area other than said moving picture area in accordance with a distance between an instant line signal of said output frame and a line signal of the same field to be combined with said instant line signal; and output terminal means connected to said line combiner means for obtaining said output television signal.

2. A system according to claim 1, in which said line combiner means comprises first multiplier means connected to said memory means for multiplying the line signals of an odd field of said input television signal readout from said memory means, second multiplier means connected to said memory means for multiplying the line signals of an even field of said input television signal readout from the memory means, a scale-of-$n$ counter means counting the horizontal synchronizing pulses of said second synchronizing terminal means after resetting by each of said vertical synchronizing pulses of said second synchronizing terminal means for varying the multiples of said first multipler means and said second multiplier means in accordance with the counting states thereof, a decision circuit for detecting whether the odd number field or the even number field in response to the vertical synchronizing pulses of said second synchronizing terminal means to actuate corresponding one group of different multiple groups of the first multiplier means and the second multiplier means, detection terminal means receptive of said moving area detection signal, means connected to said detection terminal means, said first multiplier means and said second multiplier means in response to said moving area detection signal, and an adder means connected to the outputs of said first multiplier means and the second multiplier means and the output terminal means to provide an added output as said output television signal at said output terminal means.

3. A system according to claim 1, in which said detection means comprises subtractor means connected to said memory means for obtaining a difference between two outputs of said memory means having a time difference equal to one frame of the input television signal from each other, threshold level detector means connected to said subtractor means for generating each of detection pulses when the absolute value of said difference between said two outpus of said memory means exceeds the predetermined level, and counter means connected to said threshold level detector means for counting said detection pulses and for generating said moving area detection signal when the carry pulse thereof is obtained for a predetermined number of picture elements of said input television signal.

* * * * *